United States Patent [19]
Brenner

[11] Patent Number: 4,544,585
[45] Date of Patent: Oct. 1, 1985

[54] DRAPEABLE DECORATIVE SHEET MATERIAL

[76] Inventor: Gerhard E. Brenner, 132 Hiscock Blvd., Scarborough, Ontario, Canada, M1G 1T5

[21] Appl. No.: 671,519

[22] Filed: Nov. 15, 1984

[51] Int. Cl.[4] ........ A01N 3/00
[52] U.S. Cl. ........ 428/17; 427/202; 427/206
[58] Field of Search ........ 428/17, 904.4; 427/202, 427/206

[56] References Cited

U.S. PATENT DOCUMENTS

| | | | |
|---|---|---|---|
| 3,607,488 | 9/1971 | Colon Yordan | 156/57 |
| 4,209,550 | 6/1980 | Hagenbach et al. | 427/27 |
| 4,244,992 | 1/1981 | Von Hagens | 428/15 |
| 4,283,445 | 8/1981 | Bartholl | 428/17 |
| 4,331,712 | 5/1982 | Cohen et al. | 427/202 |
| 4,369,201 | 1/1983 | Kober | 427/4 |

*Primary Examiner*—James J. Bell
*Attorney, Agent, or Firm*—Ridout & Maybee

[57] ABSTRACT

A drapeable decorative sheet material having a natural mossy-looking appearance has a flexible film substrate, a coating of a flexible adhesive bonded onto the film substrate, and fragments of sphagnum moss adhering to and substantially covering the adhesive layer. The fragments comprise relatively large fibrous moss fragments upstanding from the adhesive layer and having spacings between them, and relatively smaller particulate moss fragments distributed on the adhesive layer between the relatively large fragments.

17 Claims, 2 Drawing Figures

DRAPEABLE DECORATIVE SHEET MATERIAL

Figures 1, 2:
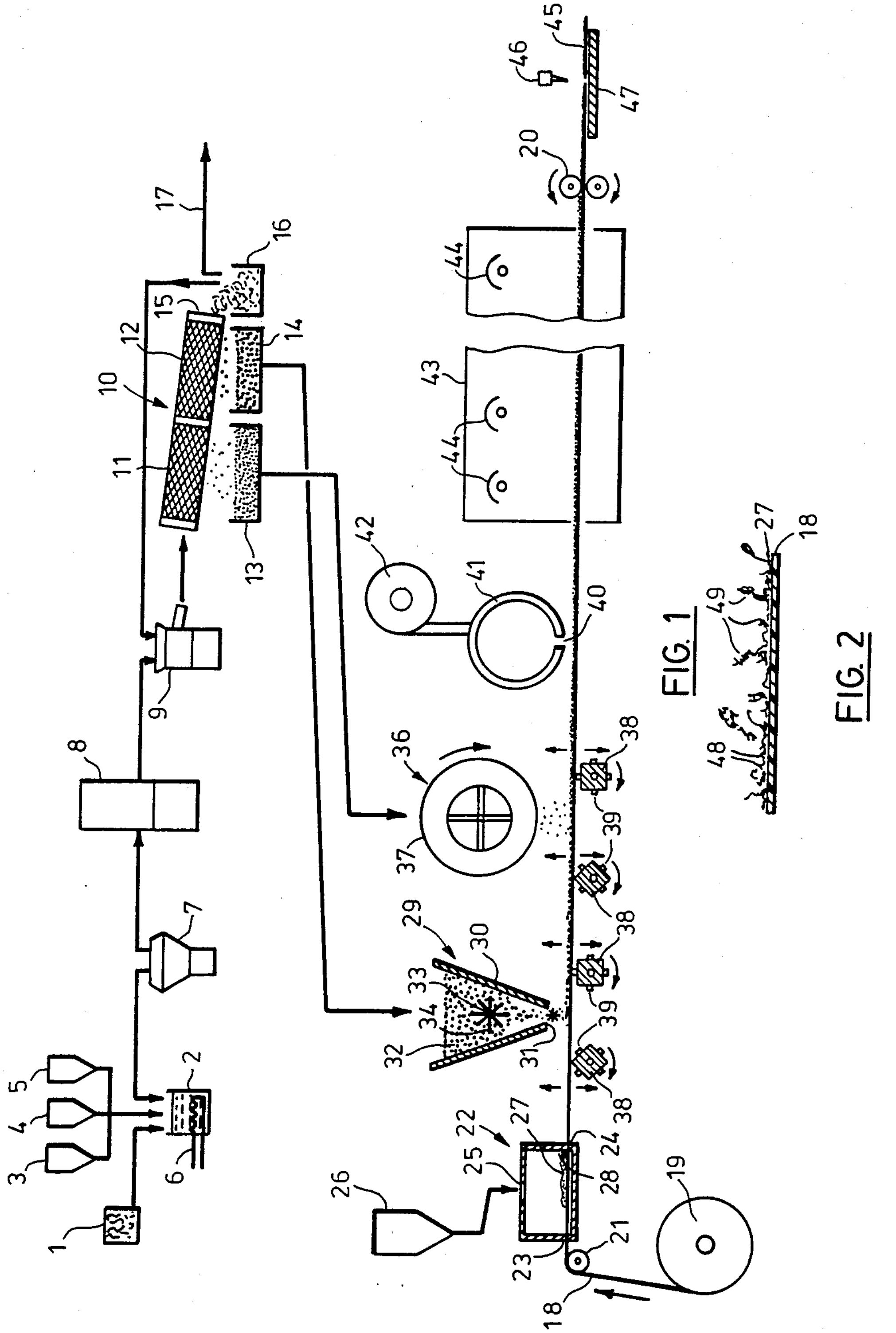

The present invention relates to drapeable decorative sheet material. There is a large demand for natural-looking drapeable sheet materials which are used in window dressings and in floral displays to conceal displaying surfaces, and the holders, foam plastic blocks and the like, used to support floral items, thus presenting a natural-looking setting. The preferred material for this purpose is a form of moss known as "sheet moss" which occurs in nature as a coherent sheet of intertwined leafy shoots. This has excellent qualities of drapeability and appearance, but is found in relatively few locations and is expensive. Up to the present time there has been, as far as the inventor is aware, no acceptable substitute for the natural sheet moss material.

The present invention provides drapeable decorative sheet material comprising a flexible film, a flexible adhesive layer bonded to the film, and fragments of sphagnum moss adhering to and substantially covering said adhesive layer, said fragments comprising relatively large fibrous fragments upstanding from the adhesive layer and having spacings between them, and relatively smaller particulate fragments distributed on the adhesive layer between the relatively large fragments.

This material may be manufactured relatively inexpensively, and the relatively large fibrous fragments of moss upstanding from the surface of the sheet provide the material with an outstandingly realistic mossy-textured appearance. The relatively small particulate fragments distributed on the adhesive surface between the larger fragments serve to conceal the adhesive and underlying film, and contribute to the natural appearance.

The material and its method of manufacture will now be described in more detail, by way of example only, with reference to the accompanying drawings wherein:

FIG. 1 illustrates somewhat schematically successive stages in the manufacturing process; and FIG. 2 shows a view from one edge of the sheet material.

The natural sphagnum moss used as a starting material for the manufacture of the present sheet material, comprising leafy moss shoots, has a somewhat unattractive grayish-green appearance, and has a rather dry, brittle texture. In order to improve the appearance and texture of the sphagnum moss material it is desirably impregnated with dye and with a humectant agent.

The preferred humectant agent is glycerin, preferably employed in solution in water in a ratio of about 1 part by volume glycerin per 20 parts by volume water. Other humectants which will preserve the moss fragments from drying out and acquiring a brittle texture during storage may of course be employed.

In order to achieve a desired moss-green coloration, it will usually be necessary to use a combination of green, yellow and black dyes. Dye materials suitable for dyeing vegetable tissue are in themselves well known. The preferred dye materials are those that, once fixed to the vegetable material, are non-running and non-staining on exposure to moisture. Typically, in order to be fixed to the vegetable tissue, the dyes need to be applied from a hot aqueous solution. In the example illustrated, bales of natural sphagnum moss 1 are broken into manageable clumps, and are placed in a tank 2 containing water, dissolved dye, and humectant supplied from tanks 3, 4 and 5, respectively. The tank 2 is equipped with a heating device 6, to maintain the contents of the tank 2 at the desired elevated temperature. After a suitable period of impregnation, e.g. 10 to 30 minutes, the dyed moss material is dried in a centrifuge 7, and subsequently in a current of warm air in a tumble dryer 8, so that it is dry to the touch. The dried material is fed to a shredder or other size reduction apparatus 9, and the size-reduced moss material is screened to separate it into relatively small and relatively large-size fractions. Suitably, the screening is conducted in a rotating cylindrical screen having its axis inclined downwardly, and consisting of a first cylindrical screen section 11, of relatively fine mesh, and a second cylindrical screen section 12 of relatively coarse mesh. The fine particles passing through the section 11 are received in a bin 13, and the coarse sections from the section 12 in a bin 14.

Preferably, the fine mesh section 11 has mesh openings in the range about 1 to about 2.5 mm square, more preferably about 1 mm square, and the coarse mesh section 12 has mesh openings about 4 to about 10 mm square, more preferably about 4 to about 8 mm square.

The fraction recovered in the bin 13 consists predominantly of small laminar particles, such as individual moss shoot particles and fragments thereof, and short lengths of stems of the moss material. Typically, this particulate fraction will comprise at least about 60% by weight of fragments having their largest dimension no greater than about 3 mm. The relatively large fragments of moss recovered through the screen 12, and obtained from the bin 14 consist predominantly of short fibrous lengths of the moss, and contains large amounts of leafy shoots. Typically the fraction recovered in the bin 14 will comprise at least about 60% by weight of fibrous fragments having their lengths in the range about 4 to about 15 mm.

Material which does not pass through the screens, and exits through the open end 15 of the screen 10, is received in a bin 16, and may be returned to the shredder 9, for further size reduction. After numerous passes through the shredder 9 and screen 10, the material may tend to contain an undesirably large quantity of woody fibrous stems, and thus periodically the material collected in the container 16 may be discarded, as indicated by the line 17.

In the preferred form, the flexible film material which forms the substrate of the sheet material of the invention is a relatively thin plastic film. The film need only be sufficiently strong to withstand handling without undue risk of tearing, and is desirably sufficiently thin that, for convenience of use in floral arrangements, etc., it can readily be perforated by pressing the ends of flower stems and other floral display items firmly against it. Preferably, the film is a polyethylene film with a thickness in the range about 0.001 to about 0.02 mm, more preferably about 0.01 to about 0.1 mm. Desirably, the film is one which is treated on the side which is to receive the adhesive coating so as to be receptive to and to key firmly to coating materials. Such treated films, which are intended to be receptive to printing inks, paints, and the like, are in themselves well known.

In the example illustrated, the plastic film material 18 is drawn continuously from a roll 19 thereof e.g. under the traction of a pair of driven rollers 20, e.g. at the far end of the production line, over a guide roll 21, and through a coating box 22 where the adhesive layer is applied. The box 22 has slots 23 and 24 at its rear and front sides, through which the film is drawn, and an opening 25 in its top into which a liquid adhesive composition is supplied from a reservoir thereof 26. The adhesive employed is one which, at least in relatively thin layers, is flexible. Preferably, the adhesive employed is a pressure sensitive adhesive composition, and more preferably is a water based pressure-sensitive resin emulsion. The adhesive is coated onto the film to form a layer which has sufficient thickness to firmly anchor to it the moss fragments which are to be applied, but is not so thick as to impart undue stiffness to the finished sheet material. Preferably, the adhesive layer has a thickness of about 0.05 to about 1 mm, more preferably about 0.1 to about 0.5 mm. Preferably, in order to assist in spreading the liquid adhesive 27 evenly over the surface of the film 18, a spreader device is provided within the coating box 22. The spreading device may be a metal rod 28, having generally circumferentially-extending grooves in its surface, e.g. a continuous screw thread, which rests freely on the upper surface of the film 18, and is retained loosely against the inner side of the front wall of the coating box 22 in a position extending transversely of the film 18. The thickness of the film of adhesive applied to the film may be varied by varying the diameter of the rod 28, and the depth and the pitch of its grooves.

Screened moss fragments are then applied to the upper side of the layer of tacky adhesive while this is still wet. Relatively large size fragments, obtained from the bin 14 are applied from a hopper 29, which has downwardly inclining walls 30 terminating at a lower opening 31 extending transversely across the width of the film 18. In order to prevent the moss fragments 32 from lodging within the hopper 29, a driven agitator shaft 33 may be provided within the hopper. The shaft 33 is provided with transversely extending agitator elements 34. A similar agitator device 35 may be provided adjacent the opening 31, to prevent the moss fragments from lodging in and blocking the opening 31. Because of their fibrous and leafy-shoot-like nature, the relatively large, fibrous fragments tend to interengage with one another as they are applied onto the adhesive, do not form a mat completely covering the adhesive layer, and leave spacings between them, at which portions of the surface of the adhesive material are exposed.

After the relatively large fragments have been applied, the adhesive-coated film is passed under a rotating cylindrical screen 36 and having a cylindrical surface 37 consisting of a mesh having a mesh opening slightly larger than the mesh opening of the first screen 11. The cylindrical screen 36 is driven to rotate about its axis, which extends transversely of the film 18. The screen 36 is loaded with the relatively small particulate screened material obtained from the bin 13 and, as it rotates, it showers the particulate material onto the adhesive-coated film.

These relatively small particulate fragments fill in the spacings between the larger fibrous fragments applied from the hopper 29, and adhere to the entire exposed upper surface of the adhesive layer, and thus provide the material with a substantially complete covering of the moss fragments, so that there are no areas of the adhesive layer which are left exposed.

Desirably, the moss fragments are applied to the adhesive-coated film 18 while the film is being vibrated in a direction perpendicular to its general plane. In the example illustrated, this is achieved by disposing beneath the film 18, in the region adjacent the hopper 29 and screen 36 a series of square-section bars 38, e.g. of wood. The bars 38 extend transversely beneath the film 18, are driven to rotate about their axes and are positioned such that the corners of the square bars rub on the underside of the film 18 as they rotate, as illustrated. Desirably, thin strips 39, e.g. of wood, are secured on the faces of the square-section bars 38, these strips extending longitudinally along the faces of the bars 38 and transversely of the film, and being of such thickness that, as the bars rotate, the upper surfaces of the strips 39 also rub on the underside of the film 18. The corners of the bars 38, and the edges of the strips 39, as they engage the film 18, tend to displace the film upwardly and downwardly, thus vibrating it in directions as indicated by the small arrows in FIG. 1 in a direction perpendicular to its general plane. The vibration assists in the penetration of the moss fragments within the liquid adhesive composition 27, so that portions of the fragments contacting the surface of the adhesive tend to become firmly anchored in the adhesive layer. Also, the vibration results in the fragments of moss applied to the adhesive, particularly the larger fibrous fragments applied from the hopper 29 aligning themselves in positions upstanding from the general plane of the film 18, thus providing more realistic mossy-appearing lofty texture to the fragment-coated material.

After coating the film with the fragments, any non-adhering fragments are removed from the film by blowing them away with streams of air directed downwardly from nozzle openings 40 spaced transversely along the lower surface of a cylindrical plenum 41 extending transversely above the film 18, and supplied with air from a blower 42.

The moss fragment-coated film is then passed through a drying oven 43 wherein the film is heated for a period sufficient to dry substantially all free moisture from the coating of water-based adhesive 27 so that, in storage, free moisture from the adhesive layer does not tend to be absorbed into the moss fragments, which would tend to be subject to deterioration, e.g. mold or other microbiological growth, if they remained moist for prolonged periods. In the preferred form, the sheet material is heated within the oven 43 by exposure to infrared radiation from infrared lamps 44. The infrared radiation is particularly effective in heating the wet adhesive layer and driving moisture from it.

The dried sheet material, on exiting from the oven 43 is then preferably severed into separate lengths 45, for example by cutting it with a guillotine 46 on a board 47.

The resulting sheet material has an outstandingly natural-looking mossy appearance. As illustrated in FIG. 2, the adhesive layer 27 coated on the film layer 18 is substantially completely covered with particulate relatively fine moss fragments, which conceal the adhesive material 27. The relatively large sprig-like fibrous fragments 49 of the moss which extend upwardly from the surface of the sheet at irregular intervals and at various attitudes, present a natural mossy-looking appearance and texture.

An example of a method of making the drapeable mossy sheet material will now be given.

EXAMPLE

Using the apparatus illustrated in the drawings, bales of sphagnum moss were broken into clumps by hand, and were immersed in the tank 2 containing a solution of 1 volume glycerin U.S.P. in 20 volumes of water. Also dissolved in the liquid in the tank 2 were the following dyes, employed in the parts by weight indicated per 1 kg of moss:

| | | | |
|---|---|---|---|
| SANDOCRYL* | Brilliant Yellow | B- 6GL200 | 100 g |
| SANDOCRYL* | Black | B- BLN | 50 g |
| Malachite | Green | | 20 g |

*trademarks

The above dyes were obtained from Sandoz Canada Inc., Dorval, Quebec, Canada.

The treatment solution in the tank 2 was heated to 75° to 80° C., and the sphagnum moss was maintained in the solution for a period of about 15 minutes. It was then removed, centrifuged, tumble dried for 30 minutes, and passed to a Steinmax 1500 (trade mark) chopper shredder machine, obtained from Steinmax Crones & Co., D-8800 Ansback, West Germany. The fragmented material obtained from the chopper-shredder device was screened through the cylindrical screen 10 having a fine mesh section 11 with mesh openings about 1 mm square, and a coarse mesh section 12 having openings about 6.5 mm square.

The plastic film 18 was a 1 mil (approximately 0.025 mm) thickness polyethylene film having its surface treated to be receptive to aqueous-based compositions. The film employed was that obtained under the designation 25 LT3 PA from DuPont Canada Inc., Montreal, Quebec, Canada.

The adhesive 27 was a water based pressure-sensitive resin emulsion available under the designation R1815 from Industrial Adhesives division of Timminco Limited, Toronto, Ontario, Canada. The adhesive was applied to the film 18 at a coating weight of about 14 kg per 42 square meters of the film 18. The adhesive composition had a density of about 1.13 kg/l, and was thus applied to the film at a coating thickness of about 0.3 mm. After application of the coarse fibrous moss fragments and the fine moss fragments and removal of excess, non-adhering fragments, the moss fragment-coated film was passed through the drying oven 43 and was dried under infrared radiation over a period of about 10 minutes.

The resulting film had a natural-looking mossy appearance, and had excellent qualities of flexibility and drapeability.

I claim:

1. Drapeable decorative sheet material comprising a flexible film, a flexible adhesive layer bonded to the film, and fragments of sphagnum moss adhering to and substantially covering said adhesive layer, said fragments comprising relatively large fibrous fragments of the moss upstanding from the adhesive layer and having spacings between them, and relatively smaller particulate fragments of the moss distributed on the adhesive layer between the relatively large fragments.

2. Sheet material according to claim 1 wherein the fragments are impregnated with dye to achieve a moss-green coloration.

3. Sheet material according to claim 1 wherein the fragments are impregnated with a humectant.

4. Sheet material according to claim 3 wherein said humectant is glycerin.

5. Sheet material according to claim 1 wherein the small fragments pass through a mesh opening about 1 to about 2.5 mm square, and the large fragments pass through a mesh opening about 4 to about 10 mm square.

6. Sheet material according to claim 5 wherein said mesh openings are about 1 mm and about 4 to about 8 mm square, respectively.

7. Sheet material according to claim 1 wherein the adhesive layer comprises a pressure-sensitive resin adhesive.

8. Sheet material according to claim 1 wherein the adhesive layer has a thickness of about 0.05 to about 1 mm.

9. Sheet material according to claim 8 wherein the thickness is about 0.1 to about 0.5 mm.

10. Sheet material according to claim 1 wherein said film comprises a plastic film.

11. Sheet material according to claim 10 wherein said film is polyethylene film.

12. Sheet material according to claim 1 wherein said film has a thickness of about 0.001 to about 0.2 mm.

13. Sheet material according to claim 12 wherein said thickness is about 0.01 to about 0.1 mm.

14. Method of making drapeable decorative sheet material comprising impregnating sphagnum moss with dyeing and humectant agents in aqueous solution, drying the dyed and impregnated moss, subjecting the dried moss to size reduction, screening the fragments to obtain a particulate fraction passing through about 1 to about 2.5 mm square mesh openings and screening the oversize fragments to obtain a fibrous fraction passing through about 4 to about 10 mm square mesh openings, coating a water-based pressure sensitive resin emulsion on a plastic film to form a tacky pressure-sensitive layer thereon, applying to the pressure sensitive layer firstly said fibrous fraction of size-reduced moss fragments and secondly said particulate fraction of size-reduced moss fragments, to substantially completely cover the pressure-sensitive layer with said moss fragments adhering to the surface of said layer, and drying the moss-covered sheeting thus obtained.

15. Method according to claim 14 including removing non-adhering moss fragments before drying the moss-covered sheeting.

16. Method according to claim 14 wherein the moss covered sheeting is dried by subjecting it to infrared radiation.

17. Method according to claim 14 wherein the adhesive-coated sheet is vibrated in a direction perpendicular to its general plane while said fragments are being applied.

* * * * *